United States Patent [19]

Sellers et al.

[11] 3,899,560

[45] Aug. 12, 1975

[54] METHOD OF PREPARING TRANSPARENT ALUMINA

[75] Inventors: David J. Sellers, Peperell; William H. Rhodes, Lexington; Thomas Vasilos, Winthrop, all of Mass.

[73] Assignee: Avco Corporation, Cincinnati, Ohio

[22] Filed: Feb. 14, 1972

[21] Appl. No.: 226,338

Related U.S. Application Data

[62] Division of Ser. No. 717,585, April 1, 1968.

[52] U.S. Cl. .................... 264/65; 51/309; 264/66; 264/332; 423/625
[51] Int. Cl. .................... C04b 35/10; B29c 25/00
[58] Field of Search ......... 264/332, 65, 66; 423/625

[56] References Cited
UNITED STATES PATENTS

| | | | |
|---|---|---|---|
| 3,346,681 | 10/1967 | White et al. ................ | 264/332 X |
| 3,383,737 | 5/1968 | Greger ........................ | 264/332 X |
| 3,458,927 | 8/1969 | Wiechec .................... | 264/DIG. 58 |
| 3,597,512 | 8/1971 | Tolin et al. ................. | 264/66 X |

OTHER PUBLICATIONS

Sellers et al., "Journal of The American Ceramic Soc.", April 1967, Vol. 50, pp. 217–218.

*Primary Examiner*—Herbert T. Carter
*Attorney, Agent, or Firm*—Charles M. Hogan, Esq.; Abraham Ogman, Esq.

[57] ABSTRACT

The invention is directed to a transparent alumina material and a method of preparing this material.

The material is characterized as a dense primary recrystallized polycrystalline structure having a degree of preferred crystal orientation. The material is transparent to visible and infrared light and quantitative values are given.

The transparent alumina covered by this invention is made by means of hot forging and an annealing process for powders or dense compacts of high-purity alumina.

7 Claims, 5 Drawing Figures

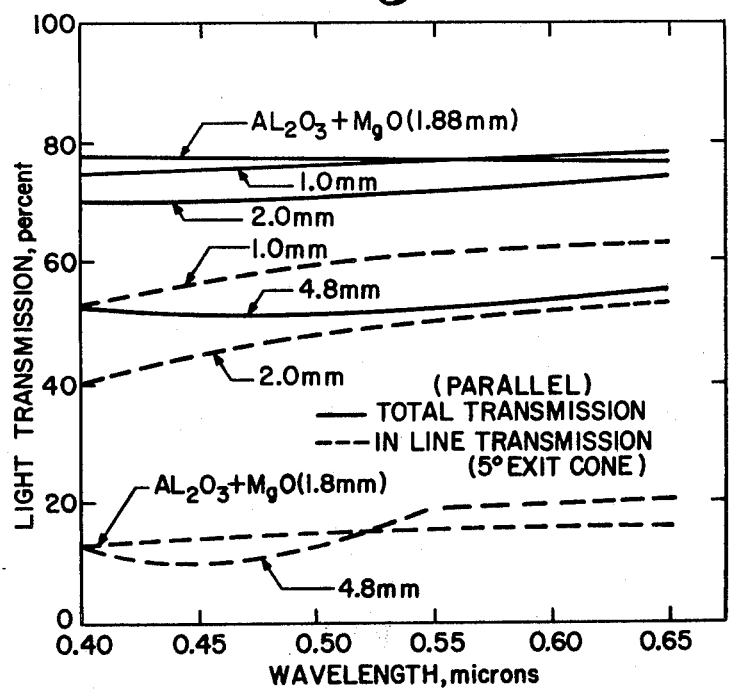

METHOD OF PREPARING TRANSPARENT ALUMINA

This is a division of application Ser. No. 717,585, filed Apr. 1, 1968.

BACKGROUND OF THE INVENTION

Previous efforts to make transparent alumina centered about hot pressing and sintering processes. Patents illustrating the latter technique are the Coble U.S. Pat. No. 3,026,210 and the St. Pierre, et al U.S. Pat. No. 3,026,177. The Coble and St. Pierre materials are dense polycrystalline structures having coarse equiaxed grains of about 20 –150 microns in diameter.

DEFINITION

Hot forging is hereby defined as a process in which a material is subjected simultaneously to high heat and pressure without lateral constraints. Accordingly, a forged material is permitted to flow laterally as it is densified under the influence of the heat and pressure.

OBJECTS

It is an object of the invention to provide a proocess for making transparent alumina.

It is another object of the invention to described a process for making transparent alumina which uses a forging and annealing procedure.

It is yet another object of the invention to provide a method of making transparent alumina by provoking primary recrystallization in the material.

Another object of the invention is to provide a dense polycrystalline alumina material having greatly improved light transmitting ability.

It is yet another object of the invention to provide a transparent alumina material characterized as a dense primary recrystallized polycrystalline alumina having a degree of preferred crystal orientation.

In accordance with the invention, an article of manufacture comprises a dense polycrystalline alumina body consisting essentially of high-purity alumina having a primary recrystallized grain structure with a degree of grains orientated preferentially with the c axis of the grains parallel to the viewing axis. The material also is characterized as having a high in line transmission efficiency in the near ultraviolet, visible and infrared light regions.

Also in accordance with the invention a method of making transparent alumina comprises making a partially dense or fully dense polycrystalline body of high-purity alumina. The partially or fully dense material is then heated above 1800°C and forged under a pressure of at least 3000 p.s.i. The forged body is then annealed at the elevated temperature and pressure for a period in excess of 70 to 120 minutes.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

Figure 3:
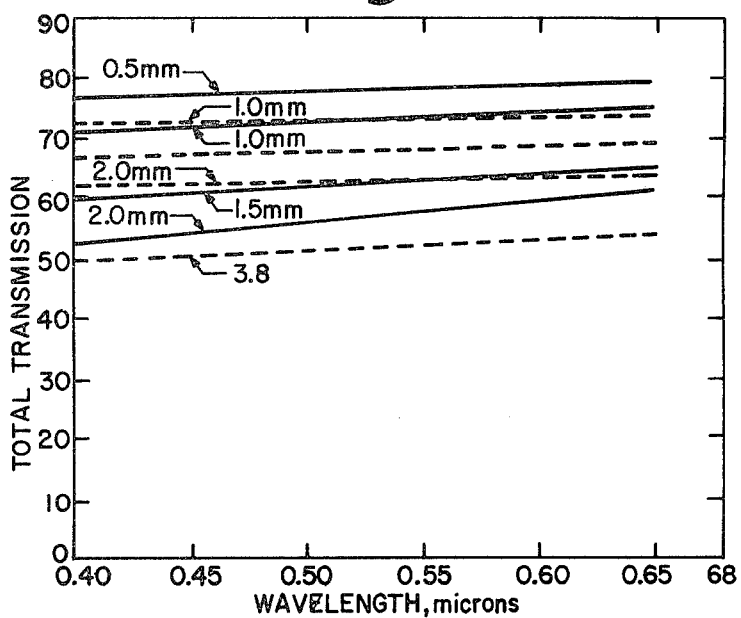

FIG. 3 contains a series of curves depicting the total transmission efficiency of forged $Al_2O_3$.

Figure 4:
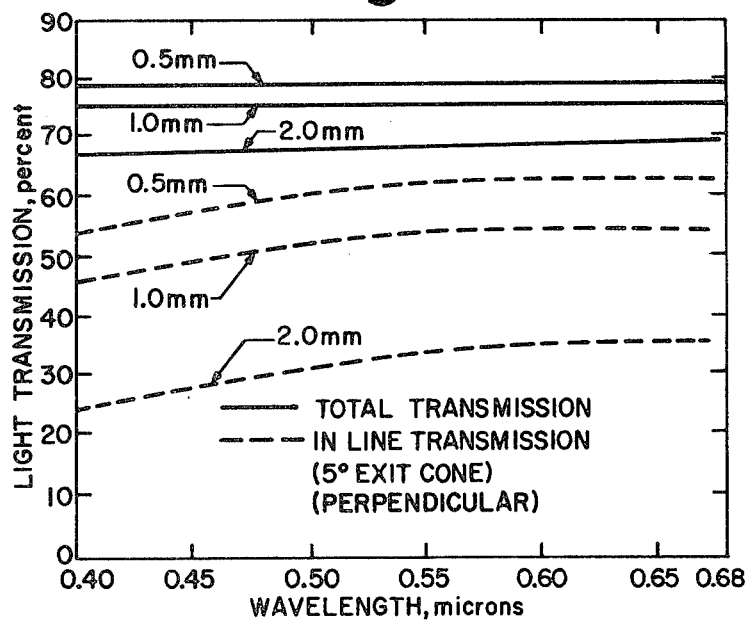

FIG. 4 contains a series of curves depicting total and in line transmission of a representative sample of forged $Al_2O_3$, taken in a direction parallel to forging.

FIG. 5 contains a series of curves depicting total and in line transmission of a representative sample of forged $Al_2O_3$ taken in a direction transverse to the direction of forging.

APPARATUS DESCRIPTION

Figure 1:
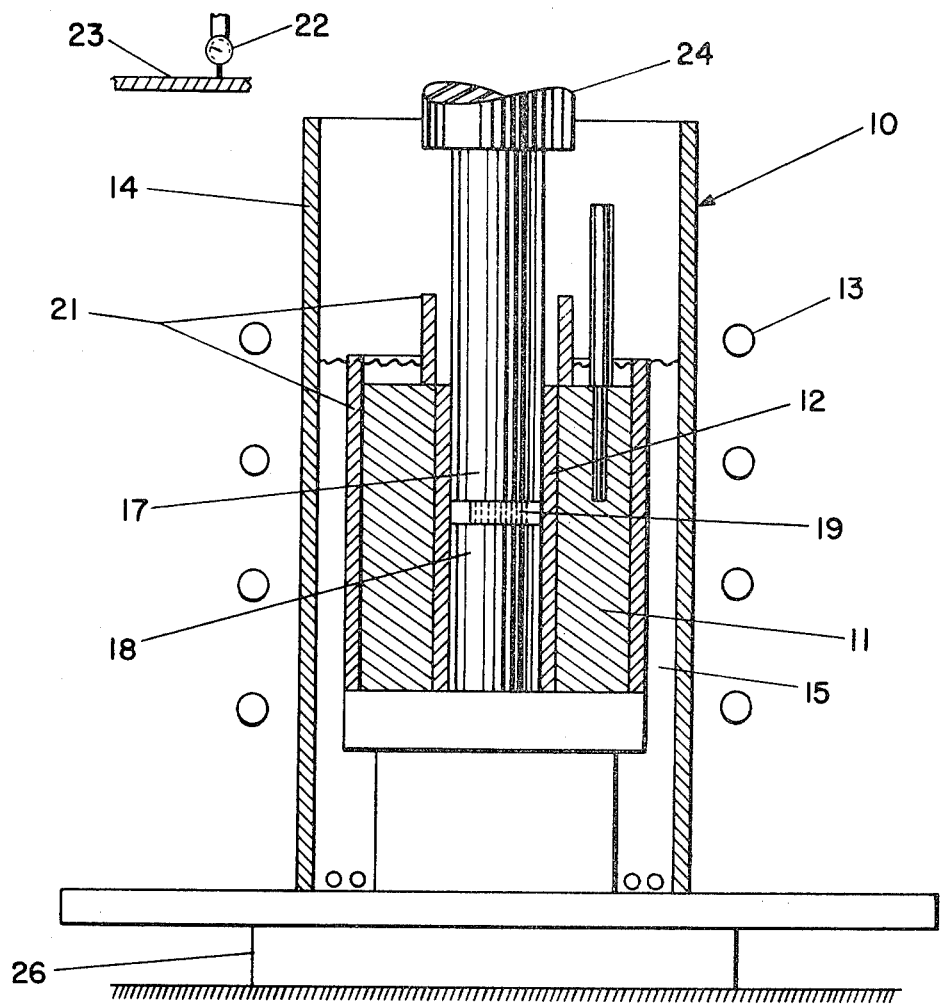
FIG. 1 is a schematic representation of a press forging assembly.

A schematic representation of a forging apparatus used to make transparent alumina is displayed in FIG. 1. The forging apparatus generally designated 10 is the same as conventional apparatus used for hot pressing metals and ceramics. It uses a graphite mold 11 which includes a die body 12 and an induction heat source 13.

The apparatus 10 also includes an outer insulating sleeve 14 made of asbestos, aluminum silicate or quartz tubing. The sleeve 14 acts as a retainer ring for fine carbon black insulation 15.

A pair of pistons 17 and 18 are aligned by the die body 12 and include an undersized partially or fully dense alumina billet 19 between opposing faces.

Graphite sleeves 21 interior to the carbon black 16 serve as a separating media between the carbon black and the graphite mold 11 and graphite die body 12. These graphite sleeves 21 allow for easy extraction of the die body 12 and associated pistons 17 and 18.

A dial indicator 22 is placed on a rigid platform 23 and is mechanically coupled to a hydraulic ram head 24 of the pressure generator (not shown). The forging apparatus 10 is seated on a support base generally designated 26.

STARTING MATERIALS

The ceramic billet 19 may be in the form of an unpressed powder, partially sintered powder, cold pressed powder or a product of intensive sintering or a product of previous hot pressing. As will become evident later, any form of starting material that is capable of being strained is a suitable starting material.

Preferably, the various forms of starting configurations listed above are derived from submicron powders of pure alumina material. The best results have been achieved with an alumina having a particle containing size of 0.3 microns or less and having a purity of at least 99.97. In practice, the lower limits of purity are governed by the percentage which does not yield a second opaque phase or that will not inhibit primary recrystallization when processed as indicated herein. Purities of 99.90 to 99.95 under these conditions were acceptable. A known grain growth inhibitor such as MgO is not operable.

The transparency of hot pressed and sintered dense polycrystalline materials are improved when subjected to the forging procedures to be described.

THEORY

Primary recrystallization can be defined as the growth of strainfree nuclei into a deformed matrix, the reduction in strain energy providing the driving force.

Figure 2:
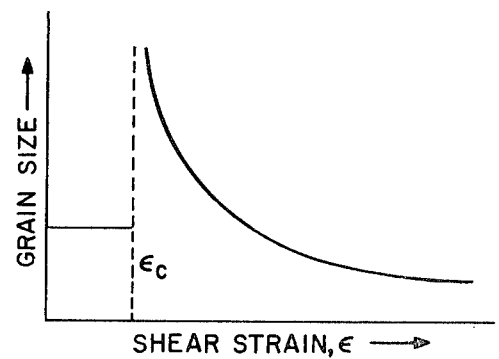
FIG. 2 is a curve useful in describing the invention.

Referring to FIG. 2, the curve depicts grain size as a function of shear strain. The strain $\epsilon_c$ on the abscissa designates a critical strain. A material strained less than $\epsilon_c$ develops into a coarse grained structure when annealed and does not undergo primary recrystallization. If a material is subjected to a strain equal to or just greater than the critical amount $\epsilon_c$ a single crystal structure evolves upon annealing. Quite unexpectedly for ceramics, if the shear strain in a material exceeds $\epsilon_c$, a fine grain structure evolves in the material upon the application of heat and pressure. This fine grain structure is truly remarkable considering, as will be seen, the strained sample, is subjected to high temperatures and pressures, in the order of 1870°C and 6000 p.s.i., for five hours. Another interesting observation is that the number of nuclei from which new crystals evolve increases with increasing strain and progressively finer grain structure after recrystallization. For alumina, $\epsilon_c$ is reached when the dimensions of the compact is reduced by at least 5%. An excellent fine grain structure is produced reliably when a 15% reduction takes place. While it is not definitely known what mechanism causes the formation of nuclei around which grain growth occurs, it is a considered opinion that the nuclei form in regions of greatest shear strain and these are generally believed to be the pores and grain boundaries. The centers of strain are relieved during annealing and are believed to form nuclei for primary recrystallization.

Another factor contributing to transparency is the almost complete absence of pores in the forged material. If, as believed, the pores are nucleation centers; the pores merge into the grain boundaries of the recrystallized grains.

A second characteristic contributing to the transparency of alumina and observed to be a direct result of forging under specified conditions of heat, pressure and time is the generation of a crystallographic texture or preferred crystal orientation. The hot forging work was found to generate material in which appreciable amounts of preferred crystal orientation were observed. This is known in Table II which lists the normalized X-ray diffraction intensities for basal planes 006, 00.12 and 10.10 a plane close to the basal plane with favorable conditions for strong reflection and the prism planes 110 and 030.

HOT WORKING OF ALUMINA $Al_2O_3$ powder of purity preferably greater than 99.9% and particle size less than 1 micron is placed in a graphite die with molybdenum spacers on top and bottom of powder and the powder is cold pressed at less than 1000 p.s.i. to reduce the bulk volume. Three different powders having particle sizes 0.05, 0.06 and 0.3 microns have been found to yield successful results. Heat is supplied over a period of 1 to 3 hours until a temperature in excess of 1800°C is reached. During the heating period the powder compact sinters and shrinks to approximately two-thirds its original volume and a density of approximately 60%. The shrinkage is uniform in all directions and as a result the diameter of the piece is two-thirds of its original value. Pressure is then applied by the ram and the powder is compacted and then subsequently forged by applying 3000 –10,000 p.s.i. pressure over a period of ¼ to 2 hours. The piece is then annealed at the maximum forging pressure for 2 to 6 hours. From 70 plus to 120 minutes are considered to be the minimum annealing time allowable. Thirty-minute and 70-minute anneals have not yielded a transparent product. The pre-sintering period under no load conditions during which the temperature was stabilized prior to the application of pressure was in the order of 2 to 5 minutes. When this period was extended for 30 minutes, extensive single crystal growth was experienced in the final product and a translucent matrix was formed. It therefore appears detrimental to allow excessive sintering to take place before the advent of the deformation step.

At the pressure levels of 3000 to 10,000 psi, forging conducted between 1840°C and 1900°C yielded transparent material. A forging run FA-45 conducted at 1810°C to 1830°C resulted in an essentially translucent product. However, at 1830°C and a pressure of 5400 p.s.i. (run FA-46) a transparent product resulted.

Previous work involving long term forging alumina below 1800°C were found to yield translucent products at best, probably because of the pressure limitations imposed by the capability of the pressing apparatus. Temperatures above 1900°C were found to result in the development of a single or small number of very large grains during recrystallization. Process temperatures about 1940°C have shown that alumina is likely to react severly with surrounding graphite media in this temperature range.

Table I below contains a listing of fabrication conditions used to make forged $Al_2O_3$. Transparent products resulted in all runs except FA-45, FA-140 and FA-142. In FA-45 a translucent product was found. Runs FA-140 and FA-142 were not successful because of insufficient annealing time, i.e., time at maximum pressure.

TABLE I

Fabrication Conditions for Transparent Polycrystalline $Al_2O_3$

| Billet No. | Powder Type | Forging Temperature (°C) | Forging Pressure (p.s.i.) | Time to Maximum Pressure (minutes) | Time at Maximum Pressure (minutes) |
|---|---|---|---|---|---|
| FA-44 | A | 1840–1860 | 4000 | 55 | 120 |
| FA-45 | A | 1810–1830 | 4000 | 45 | 215 |
| FA-46 | A | 1820–1860 | 5400 | 46 | 300 |
| FA-47 | A | 1850–1880 | 5400 | 35 | 335 |
| FA-100 | B | 1860 | 5100 | 20 | 125 |
| FA-102 | B | 1840 | 5200 | 30 | 180 |
| FA-103 | B | 1860 | 5400 | 15 | 180 |
| FA-106 | B | 1870 | 6000 | 17 | 308 |
| FA-107 | C | 1870 | 6000 | 25 | 133 |
| FA-109 | A | 1860–1880 | 6800 | 30 | 250 |
| FA-110 | A | 1860–1880 | 6800 | 20 | 230 |
| FA-147 | A | 1860–1880 | 5650 | 48 | 360 |
| FA-140 | A | 1860 | 5400 | 24 | 71 |
| FA-142 | A | 1860 | 5670 | 20 | 30 |

Powder A — 0.3 microns - average particle size 99.97% purity
Powder B — 0.05 microns - average particle size 99.97% purity
Powder C — 0.06 microns - average particle size 99.95% purity The operation consists of forging $Al_2O_3$ in a laterally unconstructed die assembly. The extent of vertical deformation on the powder allows first densification by normal pressure sintering mechanisms followed by a deformation or reduction of height of the dense billet to an extent that allows plastic deformation of the material. During the annealing period, time at maximum pressure, the high temperatures prevailing allow primary recrystallization to occur in the material and the new grains form in advantageous positions or apparently experience grain growth rates that are advantageous to the removal of the last remaining porosity. The latter step produces a pore free product. The plastic deformation also creates a preferred orientation in the material which is retained in the recrystallized material. This preferred crystallographic orientation further aids in improving the transparent qualities of the product by reducing birefringence light and image scattering normally associated with an anisotropic material such as $Al_2O_3$.

The forging action appears to be necessary to produce transparency in $Al_2O_3$. Two experiments were tried at similar temperatures and annealing times in which the powder was compacted continuously during the heatup period to prevent shrinkage of the billet. These experiments which would be best described as normal hot pressings yielded compacts of very low translucency. Primary recrystallization did not occur during these trials due to a lack of plastic deformation. The material was found to contain a microstructure quite different than that produced by the forging and annealing operation. The large randomly oriented columnar grains were found to contain considerable porosity in their central areas suggesting that initial grain growth rates were excessive enough to prevent the removal of entrapped porosity. The remaining porosity accounts for the lack of transparency in these pieces.

Forging and annealing operations performed on dense undersized sintered or hot pressed billets have shown that it generally takes higher pressure levels to deform these materials. The degree of transparency achieved by this route seems to be slightly inferior to the powder technique but solid conclusions will have to await optical testing of these pieces.

The preferred orientation produced by the forging-anneal process is best shown in Table II.

Relative Intensities of Planes in Forged $Al_2O_3$

| Sample No. | Direction | Basal Planes 006 | 10.10 | 00.12 | Prism Planes 110 | 030 |
|---|---|---|---|---|---|---|
| Random Powder | Parallel | 1 | 15 | 3 | 40 | 50 |
|  | Perpendicular | 1 | 15 | 3 | 40 | 50 |
| FA-45 | Parallel | 0 | 66 | 17 | 15 | 19 |
|  | Perpendicular | 0 | 5 | 28 | 77 | 100 |
| FA-47 | Parallel | 8 | 100 | 18 | 12 | 1 |
|  | Perpendicular | 0 | 6 | 0 | 100 | 73 |
| FA-103 | Parallel | 0 | 11 | 0 | 0 | 0 |
|  | Perpendicular | 2 | 8 | 2 | 79 | 58 |
| FA-106 | Parallel | 36 | 63 | 15 | 47 | 16 |
|  | Perpendicular | 0 | 0 | 0 | 100 | 27 |
| FA-107 | Parallel | 14 | 77 | 14 | 12 | 18 |
|  | Perpendicular | 5 | 0 | 0 | 79 | 67 |
| FA-109 | Parallel | 5 | 9 | 2 | 6 | 8 |
|  | Perpendicular | 0 | 6 | 0 | 70 | 90 |
| FA-110 | Parallel | 5 | 24 | 9 | 4 | 3 |
|  | Perpendicular | 0 | 8 | 0 | 40 | 71 |

Here are plotted the normalized intensities of the basal planes (006, 00.12), a plane close to the basal plane (10.10) and the prism planes (110, 030) for $Al_2O_3$ taken from sections parallel and perpendicular to the pressing directions. The most meaningful readings are those for the prism planes and the 10.10 basal plane. If no orientation was achieved during the forging and annealing operations the intensities in both sections would be expected to be similar and to closely match those of the randomly oriented powder pattern shown at the top of the table. As can be perceived from the data intensity, values are enhanced for the basal planes in sections parallel to the pressing direction and for the prism planes perpendicular to the pressing direction. That is, the ratio of readings taken parallel to the direction of forging and perpendicular to the direction of forging is equal to 1 for random oriented crystals. The same ratio exceeds 1 for readings taken in the basal planes and is 0 or approaching 0 for prism plane readings. The overall effect is that the process yields a product in which an abundance of grains are oriented with the c axis running through the thickness dimension of the pieces. This is an important advantage, since the c axis is also the optical axis for this material and no birefringence is promoted when viewing through this direction.

ASPECT RATIO

Under certain conditions, the amount of material that is made transparent is reduced materially. It was found that when the aspect ratio, that is the ratio of the height of the compact to the diameter of the compact, reached 0.03 or less the process results deteriorated significantly due to doming. The doming phenomena manifests itself by a difference in thickness in the forged article. That is to say, the thickness of the center region exceeds that of the circumferential region with a smooth annular transition region. Where the aspect ratio was 0.03 or less, substantial doming occurred with little or no transparency. Aspect ratio in the order of 0.1 worked very well to produce transparency. There does not seem to be an upper limit in this ratio, although with higher and higher ratios some column bending is expected. A slight amount of lateral support—that is not enough to prevent introducing strain into the material—may be required with extremely high aspect ratios. With an aspect ratio of 0.032 the overall reduction of the compact varied from 0% at the center to 39% at the circumference. With an aspect ratio of 0.10, the overall reduction varied from 33 to 35%, while with an aspect ratio of 0.180, the reduction observed was 63.7% to 72.9%.

PROPERTIES

Sections of transparent material were polished to less than three microinch surfaces and the total diffuse transmission was measured in the visible range of light using a Beckman DK-2 extended range ratio recording spectrophotometer with attached integrating sphere. In line transmission was measured by subtracting the diffuse transmission from the total transmission on identical areas of the same samples. A 5° exit cone was utilized to evaluate diffuse transmission.

The total transmission of forgings FA-44 (solid lines) with varying thicknesses (0.5 mm., 1.0 mm., 1.5 mm. and 2.0 mm.) and forging FA-110 (dashed lines) with varying thickness (1.0 mm., 1.5 mm., 2.0 mm. and 3.8 mm.) are shown in FIG. 3. The in line transmission of the 3.8 mm. thickness of FA-110 was found to vary from 4.5% to 6.8%. The total and in line transmission of 0.5 mm., 1.0 mm. and 2.0 mm. thickness of sections of forging FA-47 cut so that the light passes perpendicular to the plane of pressing during the testing are plotted in FIG. 4.

Coble, in his patent, lists a high of 15% for 1 mm.; St. Pierre lists a high of 40% for 0.5 mm. thickness in his later patent for sintered material of improved in line transmission.

The total and in line visible transmission of 1 mm., 2 mm. and 4.8 mm. thicknesses of sections of forging FA-47 cut so light passes parallel to the plane of pressing are plotted in FIG. 5. Similar values for a 1.8 mm. thickness of a highly transparent piece of sintered material measured concurrently on the same equipment are also shown to serve as a useful comparison. Both total transmission and in line transmission values for FA-47 were found to be slightly higher for sections cut in this direction. These differences may be attributed to sampling or to a lesser degree of birefringent scattering of light passing through a predominance of optical axes in the grains in this latter. A comparison of the 2.0 mm. forged material values in FIG. 5 to the 1.8 mm. sintered material values reveals that the sintered material possesses a greater total transmission (77% v. 72% for the forged material) but a much lower in line transmission (13% v. 45% for the forged material) because of the randomly oriented grain structure produced by the sintering process.

The sintered material was found to be equivalent in in line transmission to forged material approximately 2.67 times as thick (1.8 mm. sintered v. 4.8 mm. forged material). Macroscopic variations between transparent samples are not great.

It is to be noted from the curves that the transmission efficiencies broadly, but not precisely, are a log function of sample thickness, at least in the ranges measured.

Note also that the in line transmission in a direction perpendicular to the pressing direction was also improved considerably when compared to the sintered randomly oriented material. This is not surprising in view of the crystal orientation observed.

In summary, forging and annealing results in the following effects. It causes primary recrystallization and crystal orientation. It also reduces porosity to a meaningless trace. Each of these aids and abets transparency, the combination of these effects results in a vastly improved transparent alumina body.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims:

We claim:

1. A process for producing transparent polycrystalline alumina having a primary recrystallized grain structure with C axis orientation of grains parallel to the direction of plastic deformation of the alumina crystals comprising:

forming a compact consisting essentially of submicron particles of high purity polycrystalline alumina having a purity in excess of 99.90%;

stabilizing the compact at a temperature in the region of 1800°C to 1900°C without substantial grain growth;

hot forging said compact by compressing without lateral constraints at a pressure of at least 3000 p.s.i. to introduce into said compact material a strain in excess of the critical strain; and annealing said compact under pressure for 70 minutes to 6 hours to induce primary recrystallization.

2. A method as described in claim 1 in which the aspect ratio of the dense compact is in excess of 0.03.

3. A process for producing transparent polycrystalline alumina having a primary recrystallized grain structure with C axis orientation of grains parallel to the direction of plastic deformation of the alumina crystals comprising:

forming a compact consisting essentially of submicron particles of high purity polycrystalline alumina having a purity in excess of 99.90%;

stabilizing the compact at a temperature in the region of 1800°C to 1900°C;

hot forging said compact by compressing without lateral constraints in said temperature range to introduce into said compact material a strain in excess of the critical strain; and annealing said compact under pressure within said temperature range for inducing primary recrystallization of the compact material.

4. A method as described in claim 3 in which said compressive pressure exceeds 3000 p.s.i.

5. A method as described in claim 3 wherein the aspect ratio of the dense compact is in excess of 0.03.

6. A method as described in claim 3 in which said annealing is maintained for a minimum of 70 to 120 minutes.

7. A method as described in claim 3 in which the compact dimensions are altered by at least 5% to induce a strain in excess of the critical strain.

* * * * *